US012266349B2

(12) United States Patent
Yoshida et al.

(10) Patent No.: US 12,266,349 B2
(45) Date of Patent: Apr. 1, 2025

(54) SPOKEN SENTENCE PROCESSING APPARATUS, METHOD, AND NON-TRANSITORY COMPUTER READABLE MEDIUM

(71) Applicant: KABUSHIKI KAISHA TOSHIBA, Tokyo (JP)

(72) Inventors: Takami Yoshida, Kamakura Kanagawa (JP); Kenji Iwata, Machida Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 234 days.

(21) Appl. No.: 17/898,067

(22) Filed: Aug. 29, 2022

(65) Prior Publication Data
US 2023/0134696 A1    May 4, 2023

(30) Foreign Application Priority Data
Nov. 1, 2021    (JP) .................................. 2021-178503

(51) Int. Cl.
*G10L 15/22*    (2006.01)
*G10L 15/08*    (2006.01)

(52) U.S. Cl.
CPC .............. *G10L 15/08* (2013.01); *G10L 15/22* (2013.01); *G10L 2015/225* (2013.01)

(58) Field of Classification Search
None
See application file for complete search history.

(56) References Cited

U.S. PATENT DOCUMENTS

| | | | | |
|---|---|---|---|---|
| 5,577,164 | A  * | 11/1996 | Kaneko | G10L 15/22 |
| | | | | 704/E15.04 |
| 8,688,453 | B1 * | 4/2014 | Joshi | G10L 15/00 |
| | | | | 707/738 |
| 10,311,867 | B2 | 6/2019 | Ito et al. | |
| 11,355,098 | B1 * | 6/2022 | Zhong | G10L 15/22 |
| 11,966,697 | B2 * | 4/2024 | Kothuvatiparambil | |
| | | | | G06F 40/20 |
| 2001/0041978 | A1* | 11/2001 | Crespo | G10L 15/1815 |
| | | | | 704/E15.024 |

(Continued)

FOREIGN PATENT DOCUMENTS

| | | |
|---|---|---|
| JP | 2006317573 A | 11/2006 |
| JP | 2011215742 A | 10/2011 |

(Continued)

OTHER PUBLICATIONS

Japanese Office Action (and an English language translation thereof) dated Jan. 21, 2025, issued in counterpart Japanese Application No. 2021-178503.

*Primary Examiner* — Neeraj Sharma
(74) *Attorney, Agent, or Firm* — Holtz, Holtz & Volek PC

(57) ABSTRACT

According to one embodiment, a spoken sentence processing apparatus includes a processing circuit. The processing circuit receives a spoken sentence from a user. The processing circuit estimates an intention expressed by the user based on the spoken sentence. The processing circuit estimates a search condition specified by the user based on the spoken sentence. The processing circuit determines whether the spoken sentence is an invalid speech respectively in a first estimation result related to the estimated intention and a second estimation result related to the estimated search condition.

13 Claims, 9 Drawing Sheets

(56) References Cited

U.S. PATENT DOCUMENTS

| | | | |
|---|---|---|---|
| 2006/0020466 A1* | 1/2006 | Cousineau | G10L 15/1822 |
| | | | 704/E15.026 |
| 2010/0198583 A1* | 8/2010 | Su | G10L 21/06 |
| | | | 704/E15.005 |
| 2016/0055240 A1 | 2/2016 | Tur et al. | |
| 2019/0139537 A1 | 5/2019 | Akamine et al. | |
| 2019/0214009 A1* | 7/2019 | An | H04L 12/282 |
| 2020/0257494 A1* | 8/2020 | Babushkin | G06F 16/116 |
| 2020/0279002 A1 | 9/2020 | Kim et al. | |
| 2020/0314264 A1 | 10/2020 | Tsuchiya | |
| 2022/0036877 A1 | 2/2022 | Baba et al. | |
| 2022/0189474 A1* | 6/2022 | Sharifi | G06F 3/0488 |

FOREIGN PATENT DOCUMENTS

| | | |
|---|---|---|
| JP | 2018194902 A | 12/2018 |
| JP | 2019086679 A | 6/2019 |
| JP | 2019109752 A | 7/2019 |
| JP | 2019144348 A | 8/2019 |
| JP | 6667504 B2 | 2/2020 |
| JP | 2020140210 A | 9/2020 |
| WO | 2020079733 A1 | 4/2020 |

* cited by examiner

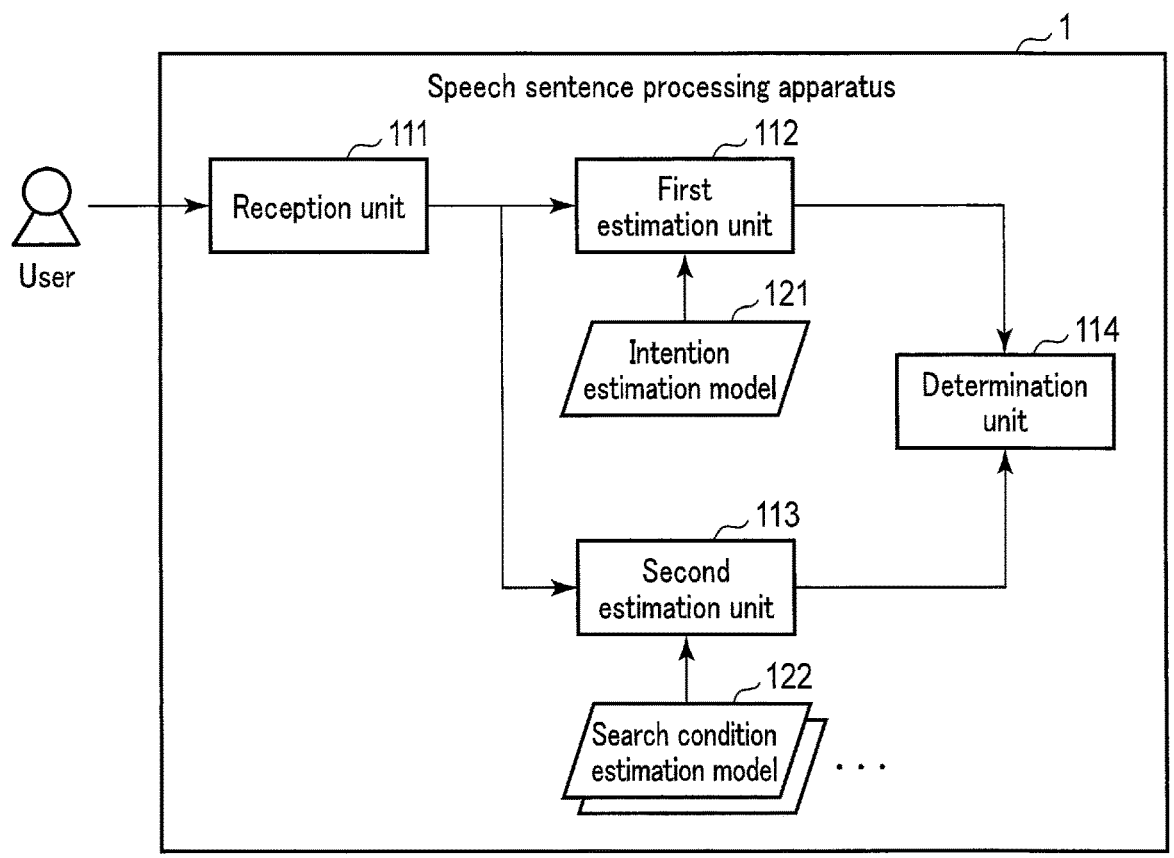
F I G. 1
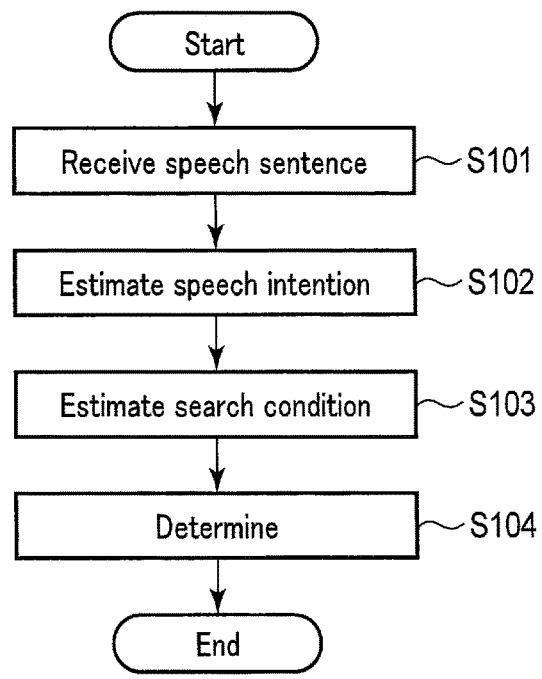
F I G. 2

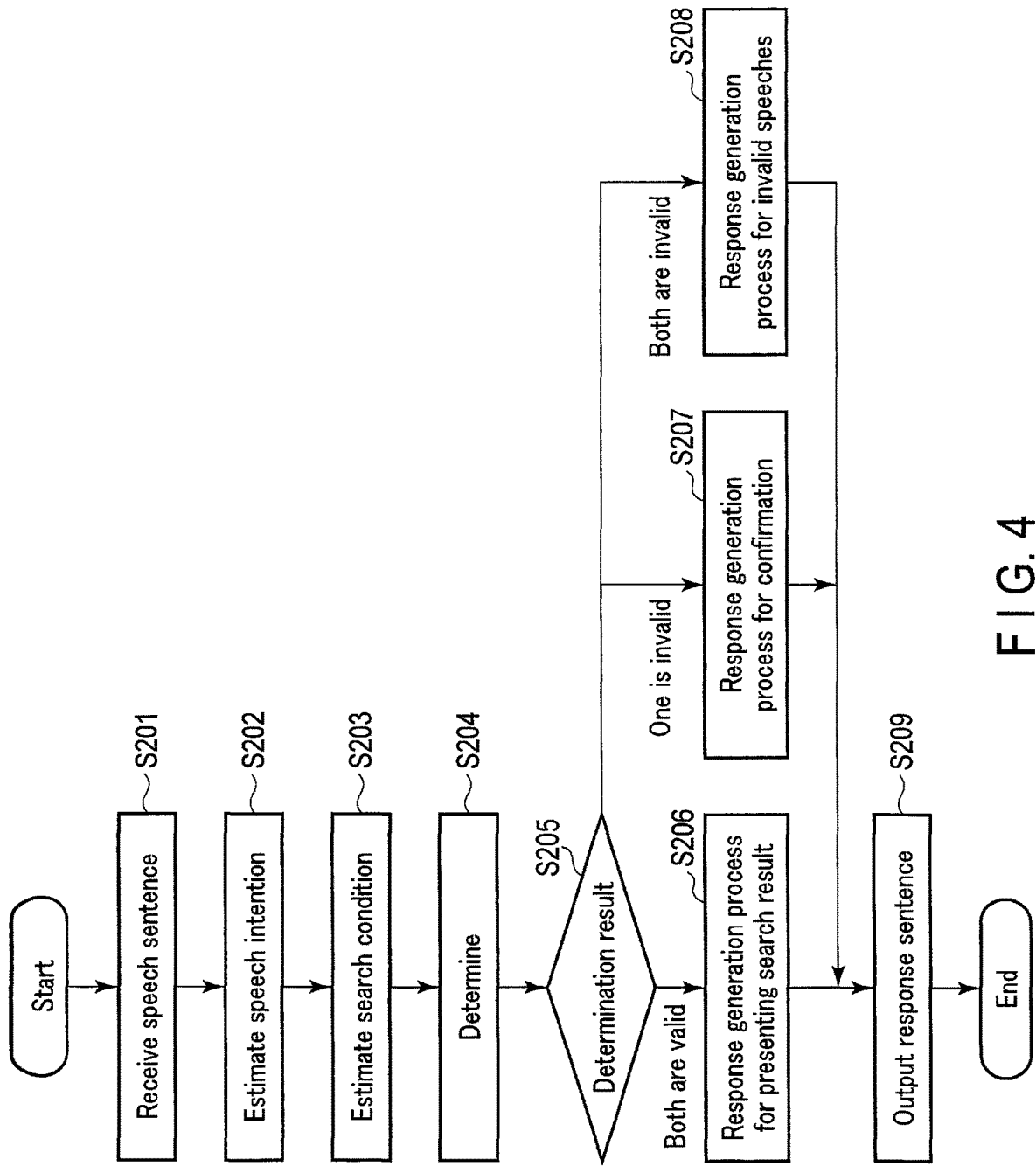
F I G. 4

(Conventional example)

FIG. 7B (Conventional example)

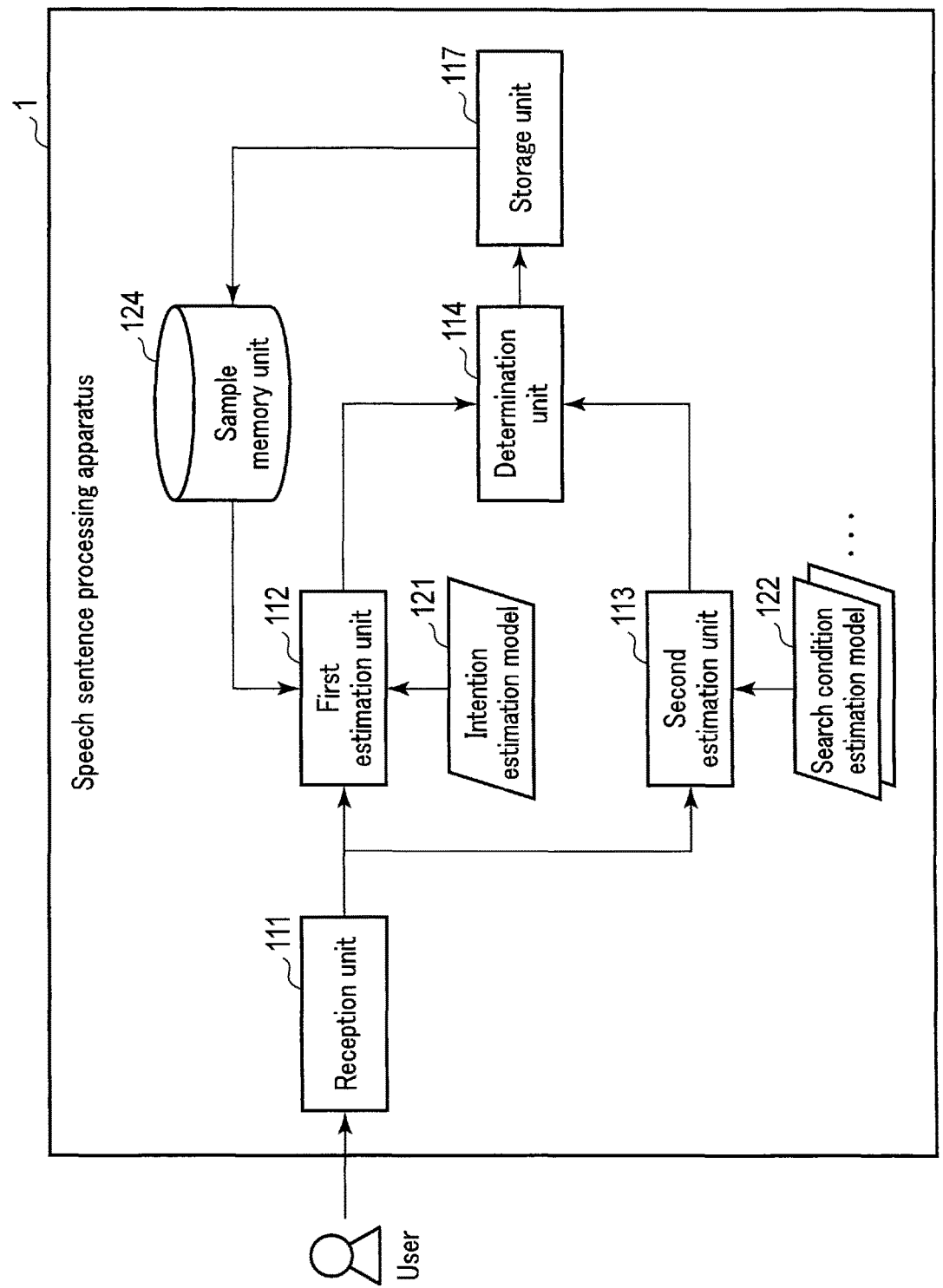
F I G. 8

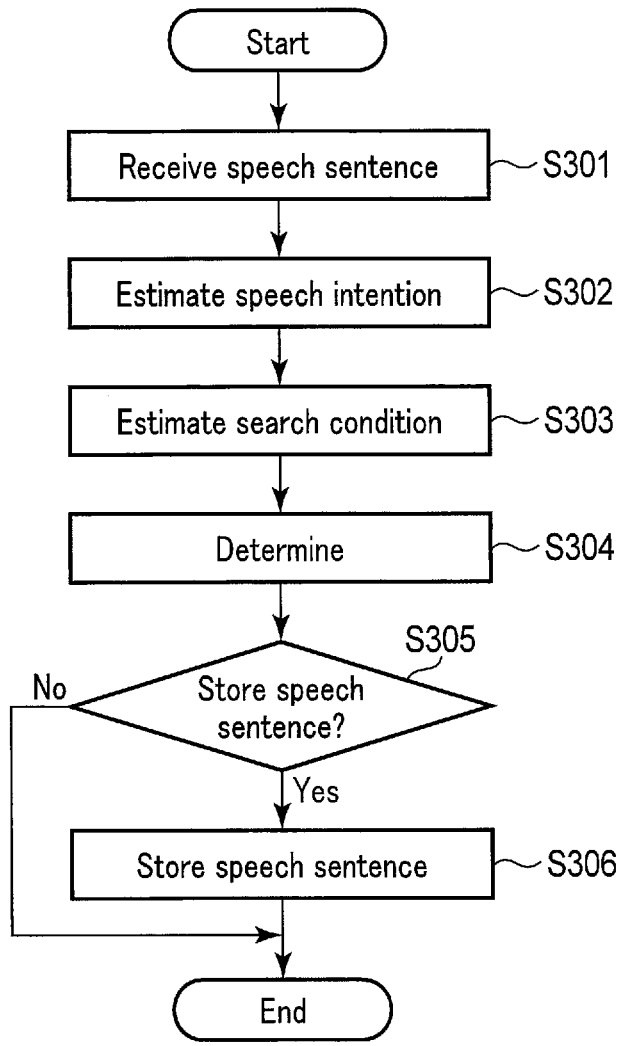
F I G. 9

SPOKEN SENTENCE PROCESSING APPARATUS, METHOD, AND NON-TRANSITORY COMPUTER READABLE MEDIUM

CROSS-REFERENCE TO RELATED APPLICATION

This application is based upon and claims the benefit of priority from Japanese Patent Application No. 2021-178503, filed Nov. 1, 2021, the entire contents of which are incorporated herein by reference.

FIELD

Embodiments described herein relate generally to a spoken sentence processing apparatus, method, and non-transitory computer readable medium.

BACKGROUND

A spoken dialog system that performs a motion desired by a user by repeating an interaction with the user a plurality of times is expected to be utilized in many scenes. In order to smoothly progress the interaction and avoid a malfunction, the spoken dialog system should correctly identify a speech from the user into a supportable speech belonging to a domain targeted by the system (hereinafter, also referred to as a "valid speech") and an unsupportable speech not belonging to the domain (hereinafter, also referred to as an "invalid speech"). In particular, it is desirable that the spoken dialog system does not perform a predetermined operation with respect to the invalid speech, and takes a measure such as asking back the user an intention or an ambiguous point of the speech or notifying that it cannot cope with the user. Therefore, the spoken dialog system is required to recognize the invalid speech with high accuracy.

In order to achieve the above object, firstly there is a method of training a spoken dialog system using speech examples regarding a large number of invalid speeches collected in advance by an engineer (for example, AI engineer). However, it is practically difficult to collect speech examples, and it is difficult to achieve the object with a general rule or a method based on machine learning. Second, there is a method in which an engineer collects an example of an invalid speech from a log of the spoken dialog system and trains the spoken dialog system using the collected example of the invalid speech. However, the method is not realistic in view of the time and physical cost required for the engineers.

BRIEF DESCRIPTION OF THE DRAWINGS

FIG. 1 is a block diagram showing a functional configuration example of a spoken sentence processing apparatus according to a first embodiment.

FIG. 2 is a flowchart showing an operation example of the spoken sentence processing apparatus according to the first embodiment.

FIG. 4 is a flowchart showing an operation example of the spoken sentence processing apparatus according to the second embodiment.

FIGS. 7A and 7B are diagrams showing an example of a dialogue realized by the spoken sentence processing apparatus according to the second embodiment.

FIG. 8 is a block diagram showing a functional configuration example of a spoken sentence processing apparatus according to a third embodiment.

FIG. 9 is a flowchart showing an operation example of the spoken sentence processing apparatus according to the third embodiment.

DETAILED DESCRIPTION

Figure 3:
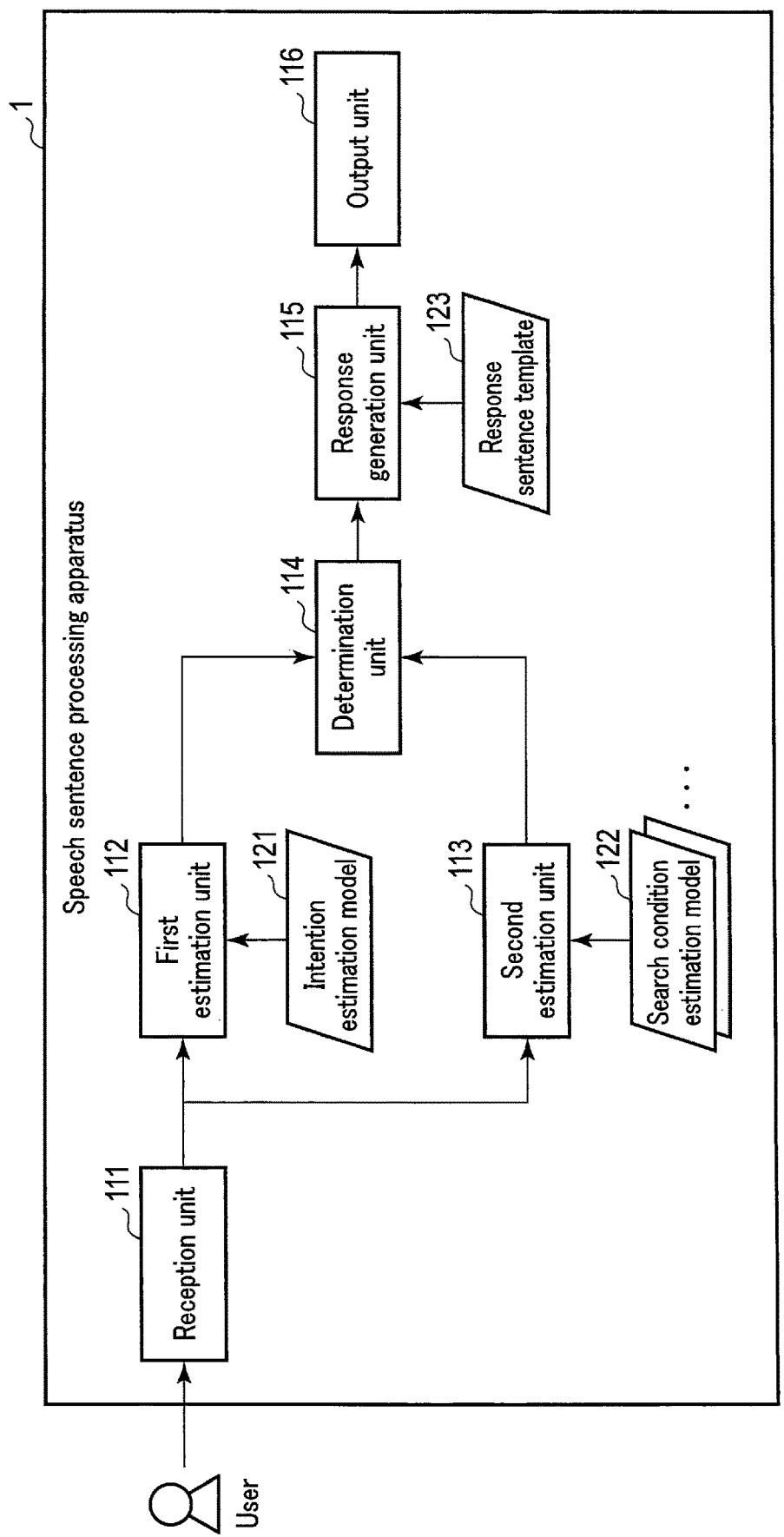
FIG. 3 is a block diagram showing a functional configuration example of a spoken sentence processing apparatus according to a second embodiment.

In general, according to one embodiment, a spoken sentence processing apparatus includes a processing circuit. The processing circuit receives a spoken sentence from a user. The processing circuit estimates an intention expressed by the user based on the spoken sentence. The processing circuit estimates a search condition specified by the user based on the spoken sentence. The processing circuit determines whether the spoken sentence is an invalid speech respectively in a first estimation result related to the estimated intention and a second estimation result related to the estimated search condition.

Hereinafter, a spoken sentence processing apparatus, a method, and a non-transitory computer readable medium according to an embodiment will be described with reference to the drawings. In the following embodiments, parts denoted by the same reference numerals perform similar operations, and redundant description will be omitted as appropriate.

First Embodiment

FIG. 1 is a block diagram showing a functional configuration example of a spoken sentence processing apparatus 1 according to a first embodiment. The spoken sentence processing apparatus 1 is an apparatus that performs various operations by processing a spoken sentence from a user, and is an example of a spoken dialog system. For example, the spoken sentence processing apparatus 1 is a spoken dialog system for searching that performs information search regarding a restaurant using a spoken sentence from a user. In a case where a spoken sentence (for example: "Find a Japanese restaurant.", "Is there any Japanese restaurant?", "I want to eat Japanese food.", and "I prefer Japanese food.") intended for information search regarding a restaurant is input, the spoken sentence processing apparatus 1 searches for a restaurant that serves Japanese food from a plurality of restaurants, and notifies the user of a search result such as a restaurant name and location information. On the other hand, in a case where a spoken sentence (for example: "Speaking of which, a Japanese restaurant has opened in the neighborhood", "a shop that sells Japanese clothing") not intended for the information search is input, the spoken sentence processing apparatus 1 notifies the user that, for example, the spoken sentence processing apparatus 1 cannot cope with the spoken sentence without performing the information search for restaurants. In order to realize such an operation, the spoken sentence processing apparatus 1 according to the first embodiment includes a reception unit 111, a first estimation unit 112, a second estimation unit 113, and a determination unit 114.

The reception unit 111 receives a spoken sentence from a user. The spoken sentence may be a text input by the user via an input unit such as a keyboard or a text converted from the user's voice by voice recognition. Subsequently, the reception unit 111 outputs the received spoken sentence to each of the first estimation unit 112 and the second estimation unit 113.

The first estimation unit 112 estimates an intention expressed by the user based on the spoken sentence. Specifically, the first estimation unit 112 estimates the intention of the spoken sentence by applying an intention estimation model 121 to the spoken sentence received from the reception unit 111. Then, the first estimation unit 112 outputs an estimation result by the intention estimation model 121 (an intention estimation result; a first estimation result) to the determination unit 114.

The intention estimation model 121 estimates a probability (first probability) that a spoken sentence is relevant to a class (intention class) corresponding to each of a plurality of candidates regarding an intention as the estimation result (first estimation result). Specifically, the intention estimation model 121 is a classification model based on deep learning, and outputs a probability that an input spoken sentence is relevant to each of a plurality of preset intention classes. Parameters of the intention estimation model 121 may be trained in advance using training data. Note that the intention estimation model 121 may adopt an existing intention estimation method (for example, mood analysis) based on the entire spoken sentence.

First, if a spoken sentence is, for example, "Is there any Japanese restaurant?", "I want to eat Japanese food.", or "I prefer Japanese food.", the intention of the spoken sentence is "specifying search conditions". Second, if a spoken sentence is, for example, "Hello" or "Thank you", the intention of the spoken sentence is "greeting". Third, if the spoken sentence is, for example, "Yes" or "No", the intention of the spoken sentence is "agreeing or disagreeing". Fourth, if the spoken sentence is, for example, "Start over." or "Show me the previous restaurant again.", the intention of the spoken sentence is "operating the system". As described above, since different intentions are included for each spoken sentence from the user, the intention estimation model 121 only needs to have an intention class corresponding to each intention of a spoken sentence assumed in advance.

When an engineer trains the intention estimation model 121, for example, an intention class is set for each of K (K is a natural number) intentions previously assumed such as an intention class 1 for "specifying search conditions", an intention class 2 for "greeting", an intention class 3 for "agreeing or disagreeing", an intention class 4 for "operating the system", and the like. At this time, the engineer regards "invalid speech" as one intention similarly to other intentions, and sets an intention class K+1 to "invalid speech". Subsequently, the engineer assigns any one of the intention classes 1 to K+1 to each of the examples of the plurality of spoken sentences collected in advance, and creates labeled training data. The engineer may then train the parameters of the intention estimation model 121 using the labeled training data. As a result, the intention estimation model 121 is trained to classify an example of a plurality of spoken sentences collected in advance into any one of the intention classes 1 to K+1. The trained intention estimation model 121 outputs not only a probability that a spoken sentence from the user is relevant to each of the intention classes 1 to K but also a probability that the spoken sentence is relevant to the intention class K+1.

In the above example, the engineer may not set the intention class K+1 as "invalid speech". In this case, the engineer assigns any one of the intention classes 1 to K to each of the examples of the plurality of spoken sentences collected in advance, and creates labeled training data. The engineer may then train the parameters of the intention estimation model 121 using the labeled training data. As a result, the intention estimation model 121 is trained to classify an example of a plurality of spoken sentences collected in advance into any one of the intention classes 1 to K. The trained intention estimation model 121 outputs a probability that a spoken sentence from the user is relevant to each of the intention classes 1 to K.

The second estimation unit 113 estimates a search condition specified by the user based on the spoken sentence. Specifically, the second estimation unit 113 estimates the search condition of the spoken sentence by applying at least one search condition estimation model 122 to the spoken sentence received from the reception unit 111. Subsequently, the second estimation unit 113 outputs an estimation result (a search condition estimation result; a second estimation result) by the search condition estimation model 122 to the determination unit 114. At this time, the same number of search condition estimation models 122 as the number of attributes used as search conditions may be applied.

The search condition estimation model 122 estimates a probability (second probability) that the spoken sentence is relevant to each of the plurality of values related to the search condition as the estimation result (second estimation result). Specifically, the search condition estimation model 122 is a model based on deep learning, and outputs a probability that an input spoken sentence is relevant to each of a plurality of preset values. Note that the search condition estimation model 122 may output a probability relevant to each value by focusing on a keyword included in the spoken sentence.

According to the present embodiment, it is assumed that a plurality of values corresponding to one attribute is set in advance in one search condition estimation model 122. For example, a plurality of values (for example, Japanese food, western food, Chinese food, Asian/Ethnic food) corresponding to the food genre are set in the search condition estimation model 122 for the food genre. On the other hand, a plurality of values (for example, around A station, B shopping street, suburb of C city, within a walking distance of X minutes, within a direct distance of Y meters) corresponding to the place is set in the search condition estimation model 122 for a place. Meanwhile, a plurality of values (for example, relatively high, normal, relatively cheap) corresponding to the price range is set in the search condition estimation model 122 for the price range. Each value may be a value extracted from a list of a plurality of restaurants to be searched. Furthermore, each value is not limited to a specific value that designates a predetermined value, and may include an empty value that does not designate a predetermined value. In other words, an empty value is a value that the search condition estimation model 122 does not assume as the search target.

The determination unit 114 determines whether or not the spoken sentence is an invalid speech in each of the estimation result regarding the estimated intention (first estimation result) and the estimation result regarding the estimated search condition (second estimation result). Specifically, the determination unit 114 receives the first estimation result from the first estimation unit 112 and the second estimation result from the second estimation unit 113, and determines whether the spoken sentence is an invalid speech in each estimation result.

According to the present embodiment, the determination unit 114 calculates a plurality of types of determination results. First, the determination unit 114 calculates a determination result (first determination result) indicating that the spoken sentence has been determined not to be an invalid speech in each of the first estimation result and the second estimation result. Secondly, the determination unit 114 calculates a determination result (second determination result) indicating that the spoken sentence has been determined to be an invalid speech in either the first estimation result or the second estimation result. Thirdly, the determination unit 114 calculates a determination result (third determination result) indicating that the spoken sentence has been determined to be an invalid speech in each of the first estimation result and the second estimation result. Among these, the second determination result includes a determination result (fourth determination result) indicating that the spoken sentence has been determined to be an invalid speech in the first estimation result and that the spoken sentence has not been determined to be an invalid speech in the second estimation result. Furthermore, the second determination result includes a determination result (fifth determination result) indicating that the spoken sentence has been determined not to be an invalid speech in the first determination result and that the spoken sentence has been determined to be an invalid speech in the second estimation result.

In the first estimation result, the determination unit 114 determines whether or not the user's spoken sentence is an invalid speech. For example, the determination unit 114 specifies an intention class to which the highest probability is given among the probabilities relevant to the intention classes 1 to K+1 output from the first estimation unit 112. In a case where the specified intention class is the intention class K+1 (which is the intention class corresponding to the invalid speech), the determination unit 114 determines that the user's spoken sentence is an invalid speech. Conversely, in a case where the specified intention class is not the intention class K+1, the determination unit 114 determines that the user's spoken sentence is not an invalid speech (which is valid speech).

For example, it is assumed that a probability that a spoken sentence is relevant to the intention class 1 "specifying search conditions" is 0.1, probabilities that is relevant to the intention classes 2 to K are all 0, and a probability that is relevant to the intention class K+1 "invalid speech" is 0.9. In this case, since the intention class to which the highest probability is given is the intention class K+1, the determination unit 114 determines that the user's spoken sentence is an invalid speech.

Alternatively, in a case where each probability relevant to each of the intention classes 1 to K output from the first estimation unit 112 is equal to or less than a predetermined threshold value, the determination unit 114 determines that the user's spoken sentence is an invalid speech. The predetermined threshold value can be set to an arbitrary value by an engineer who manages the spoken sentence processing apparatus 1. Conversely, in a case where at least one of the probabilities relevant to the intention classes 1 to K exceeds a predetermined threshold value, it is determined that the user's spoken sentence is not an invalid speech (which is a valid speech). Note that the determination unit 114 may determine that the spoken sentence is an invalid speech in a case where all probabilities are less than a predetermined threshold value, and may determine that the spoken sentence is not an invalid speech in a case where at least one probability is equal to or greater than a predetermined threshold value.

For example, it is assumed that the probabilities relevant to the intention classes 1 to K are all less than 0.5 and the predetermined threshold value is 0.5. In this case, since the probabilities relevant to the intention classes 1 to K are all equal to or less than the predetermined threshold value, the determination unit 114 determines that the user's spoken sentence is an invalid speech.

As described above, the determination unit 114 may determine whether or not the user's spoken sentence is an invalid speech in the first estimation result based on the probability that the spoken sentence is relevant to the intention class K+1 or based on the probability that the spoken sentence is relevant to the intention classes 1 to K. Both approaches may be applied in combination with each other, or only one of them may be applied.

On the other hand, the determination unit 114 determines whether or not the user's spoken sentence is an invalid speech in the second estimation result. For example, in a case where the probabilities relevant to the plurality of values related to the search condition output from the second estimation unit 113 are equal to or less than a predetermined threshold value, the determination unit 114 determines that the user's spoken sentence is an invalid speech. The predetermined threshold value can be set to an arbitrary value by an engineer who manages the spoken sentence processing apparatus 1. Conversely, in a case where at least one of the probabilities relevant to the plurality of values related to the search condition exceeds the predetermined threshold value, it is determined that the user's spoken sentence is not an invalid speech (which is a valid speech). Note that the determination unit 114 may determine that the spoken sentence is an invalid speech in a case where all probabilities are less than a predetermined threshold value, and may determine that the spoken sentence is not an invalid speech in a case where at least one probability is equal to or greater than a predetermined threshold value.

For example, the determination unit 114 focuses on the probability relevant to each of the plurality of values regarding the food genre output from the search condition estimation model 122 for the food genre. Here, it is assumed that the search condition estimation model 122 for the food genre outputs the probability that the search condition of the spoken sentence is relevant to each of four types of values (Japanese food, western food, Chinese food, Asian/Ethnic food). For example, it is assumed that the probabilities relevant to "Japanese food" to "Asian/Ethnic food" are all less than 0.5, and the predetermined threshold value is 0.5. In this case, since the probabilities relevant to the respective values are all equal to or less than the predetermined threshold value, the determination unit 114 determines that the user's spoken sentence is an invalid speech.

Subsequently, the determination unit 114 performs determination similar to the above for the search condition estimation models 122 other than the search condition estimation model 122 for a food genre. Specifically, the determination unit 114 determines whether or not the user's spoken sentence is an invalid speech for each of the search condition estimation models 122 including the search condition estimation model 122 for a place and the search condition estimation model 122 for a price range. When it is determined in each search condition estimation model 122 that the spoken sentence is an invalid speech, the determination unit 114 determines that the user's spoken sentence is an invalid speech. Conversely, when the at least one search condition estimation model 122 determines that the spoken sentence is not an invalid speech, the determination unit 114 determines that the user's spoken sentence is not an invalid speech.

Alternatively, the determination unit 114 specifies a value to which the highest probability is assigned among the probabilities relevant to the plurality of values related to the search condition. In a case where the specified value is an empty value (that is, a value for which a specific value is not specified), the determination unit 114 determines that the user's spoken sentence is an invalid speech. Operations similar to those described above may be performed for each of the plurality of search condition estimation models 122. In a case where an empty value is specified in all the attributes targeted by the plurality of search condition estimation models 122, the determination unit 114 determines that the user's spoken sentence is an invalid speech. Conversely, in a case where an empty value is not specified in the at least one search condition estimation model 122, the determination unit 114 determines that the user's spoken sentence is not an invalid speech.

FIG. 2 is a flowchart showing an operation example of the spoken sentence processing apparatus 1 according to the first embodiment. The start point in the present operation example can be a point in time when the spoken sentence processing apparatus 1 receives a spoken sentence from the user for the first time, or a point in time when the spoken sentence processing apparatus 1 receives a next spoken sentence after receiving a plurality of spoken sentences from the user.

In step S101, the reception unit 111 receives a spoken sentence from the user, and outputs the received spoken sentence to each of the first estimation unit 112 and the second estimation unit 113.

In step S102, the first estimation unit 112 estimates the user's speech intention by applying the intention estimation model 121 to the spoken sentence received from the reception unit 111. Subsequently, the first estimation unit 112 outputs the estimation result (first estimation result) to the determination unit 114.

In step S103, the second estimation unit 113 applies at least one search condition estimation model 122 to the spoken sentence received from the reception unit 111 to estimate the search condition of the user. Subsequently, the second estimation unit 113 outputs the estimation result (second estimation result) to the determination unit 114.

In step S104, the determination unit 114 receives the estimation result of the intention from the first estimation unit 112 and the estimation result of the search condition from the second estimation unit 113, and determines whether or not the user's spoken sentence is an invalid speech in each of the received estimation results. Subsequently, the determination unit 114 calculates a plurality of types of determination results (first determination result, second determination result, third determination result).

Note that steps S102 and S103 may be executed simultaneously, or step S103 may be executed prior to step S102. Furthermore, following step S104, the spoken sentence processing apparatus 1 may wait for reception of the next spoken sentence after ending the series of processing.

The spoken sentence processing apparatus 1 according to the first embodiment has been described above. The spoken sentence processing apparatus 1 according to the first embodiment determines whether or not a spoken sentence from a user is an invalid speech using each of an estimator based on intention estimation and an estimator based on search condition estimation. Here, a case where it is determined that the spoken sentence is not an invalid speech in one estimation result and it is determined that the spoken sentence is an invalid speech in the other estimation result (that is, in a case where the two types of estimation results contradict each other) is assumed. As described above, even in a case where one estimator has not been able to detect an invalid speech, the spoken sentence processing apparatus 1 can recognize the invalid speech using the estimation result from the other estimator. Therefore, the spoken sentence processing apparatus 1 can recognize an invalid speech with higher accuracy than a case where only one type of estimator is used.

Furthermore, in the above case, the spoken sentence processing apparatus 1 according to the first embodiment can obtain information regarding which one of the estimator based on the intention estimation and the estimator based on the search condition estimation has not been able to detect the invalid speech. Since the spoken sentence processing apparatus 1 according to the second embodiment generates the response sentence based on the information, it is possible to advance more flexible interaction as compared with a case where only one type of estimator is used.

Second Embodiment

FIG. 3 is a block diagram showing a functional configuration example of a spoken sentence processing apparatus 1 according to a second embodiment. The spoken sentence processing apparatus 1 according to the second embodiment further includes a response generation unit 115 and an output unit 116 in addition to the components (reception unit 111, first estimation unit 112, second estimation unit 113, and determination unit 114) included in the spoken sentence processing apparatus 1 according to the first embodiment.

The response generation unit 115 generates response sentences respectively corresponding to a first determination result, a second determination result, and a third determination result. As described above, the first determination result is a determination result indicating that a spoken sentence has been determined to be a valid speech by both the estimators, the second determination result is a determination result indicating that the spoken sentence has been determined to be a valid speech by one of the estimators and has been determined to be an invalid speech by the other estimator, and the third determination result is a determination result indicating that the spoken sentence has been determined to be an invalid speech by both the estimators. Furthermore, the fourth determination result included in the second determination result is a determination result indicating that the spoken sentence has been determined to be an invalid speech by the intention estimator and determined to be a valid speech by the search condition estimation unit. On the other hand, the fifth determination result included in the second determination result is a determination result indicating that the spoken sentence has been determined to be a valid speech by the intention estimator and determined to be an invalid speech by the search condition estimation unit.

Specifically, the response generation unit 115 generates a response sentence with reference to a response sentence template 123 corresponding to each determination result output from the determination unit 114. Subsequently, the response generation unit 115 outputs the generated response sentence to the output unit 116. Note that the response generation unit 115 may generate a response sentence by further referring to the estimation result (first estimation result) from the first estimation unit 112 and the estimation result (second estimation result) from the second estimation unit 113.

The response sentence template 123 is a plurality of fixed phrases prepared in advance for each determination result. First, as the response sentence template 123 corresponding to the first determination result, for example, a fixed phrase (for example, "How about an XX restaurant?") including a placeholder (XX) in which a predetermined search result can be embedded is prepared. The predetermined search result includes a search result related to each of a food genre, a place, and a price range.

Secondly, as the response sentence template 123 corresponding to the fourth determination result among the second determination results, a fixed phrase (for example, "Is XX acceptable for food category?") including a placeholder (XX) in which a predetermined search result can be embedded and prompting the user to confirm the search condition estimated by the second estimation unit 113 is prepared.

On the other hand, as the response sentence template 123 corresponding to the fifth determination result in the second determination result, a fixed phrase corresponding to the intention estimated by first estimation unit 112 is prepared. For example, if the estimated intention is "specifying search conditions", a fixed phrase (for example, "What kind of food would you like?") that prompts the user to specify at least one search condition is prepared. This is because it is assumed that the user has specified the attribute of the search condition not supported by the spoken sentence processing apparatus 1. Alternatively, a fixed phrase (for example, "search cannot be performed under the condition") indicating that the search cannot be performed under the search condition input by the user may be prepared. This is because it is assumed that the user specifies an unknown value relevant to the attribute of the search condition handled by the spoken sentence processing apparatus 1.

Thirdly, as the response sentence template 123 corresponding to the third determination result, a fixed phrase (for example, "Is there any other information you want to know?") notifying that the spoken sentence processing apparatus 1 cannot cope with is prepared.

The output unit 116 outputs the response sentence. Specifically, the output unit 116 receives the response sentence from the response generation unit 115 and outputs the received response sentence to the user. The output unit 116 may output, for example, a response sentence to a display device (for example, a display, a smartphone), and the display device may display the response sentence to the user. Alternatively, the output unit 116 may output the response sentence to an audio device (for example, a speaker, a smartphone), and the audio device may convert the response sentence into a voice and reproduce the voice for the user. According to any one of the output modes, the user can visually or aurally recognize the response sentence for the spoken sentence.

FIG. 4 is a flowchart showing an operation example of the spoken sentence processing apparatus 1 according to the second embodiment. Steps S201 to S204 according to the second embodiment are similar to steps S101 to S104 according to the first embodiment. Note that, in step S204, it is assumed that the determination unit 114 has calculated any one of the first determination result, the second determination result, and the third determination result described above for the spoken sentence from the user.

In step S205, the response generation unit 115 branches the process according to the type of the determination result received from the determination unit 114. Firstly, when receiving the first determination result (that is, in a case where it is determined that the spoken sentence is a valid speech in both estimation results), the response generation unit 115 proceeds to step S206. Secondly, when receiving the second determination result (that is, in a case where it is determined that the spoken sentence is an invalid speech only in one estimation result), the response generation unit 115 proceeds to step S207. Thirdly, when receiving the third determination result (that is, in a case where it is determined that the spoken sentence is an invalid speech in both estimation results), the response generation unit 115 proceeds to step S208.

In step S206, the response generation unit 115 generates a response sentence for presenting the search result based on the estimation result of the intention, the estimation result of the search condition, and the response sentence template 123. For example, the response generation unit 115 searches for information relevant to a specific condition based on the estimated search condition and calculates a search result. Subsequently, the response generation unit 115 generates a response sentence by embedding the calculated search result in the response sentence template 123 corresponding to the search result.

In step S207, the response generation unit 115 generates a response sentence for prompting the user to confirm based on the estimation result of the intention, the estimation result of the search condition, and the response sentence template 123. For example, the response generation unit 115 generates a response sentence by selecting the response sentence template 123 for explaining the situation among the plurality of response sentence templates 123.

In step S208, the response generation unit 115 generates a response sentence indicating that the user's spoken sentence is an invalid speech based on the intention estimation result, the search condition estimation result, and the response sentence template 123. For example, the response generation unit 115 generates a response sentence by selecting the response sentence template 123 indicating that the response sentence cannot be made.

In step S209, the output unit 116 receives the response sentence from the response generation unit 115, and outputs the received response sentence to an output apparatus such as a display device or an audio device. The output apparatus outputs the response sentence to the user.

Note that, following step S209, the spoken sentence processing apparatus 1 may end a series of processes and wait for reception of the next spoken sentence.

Figure 5:
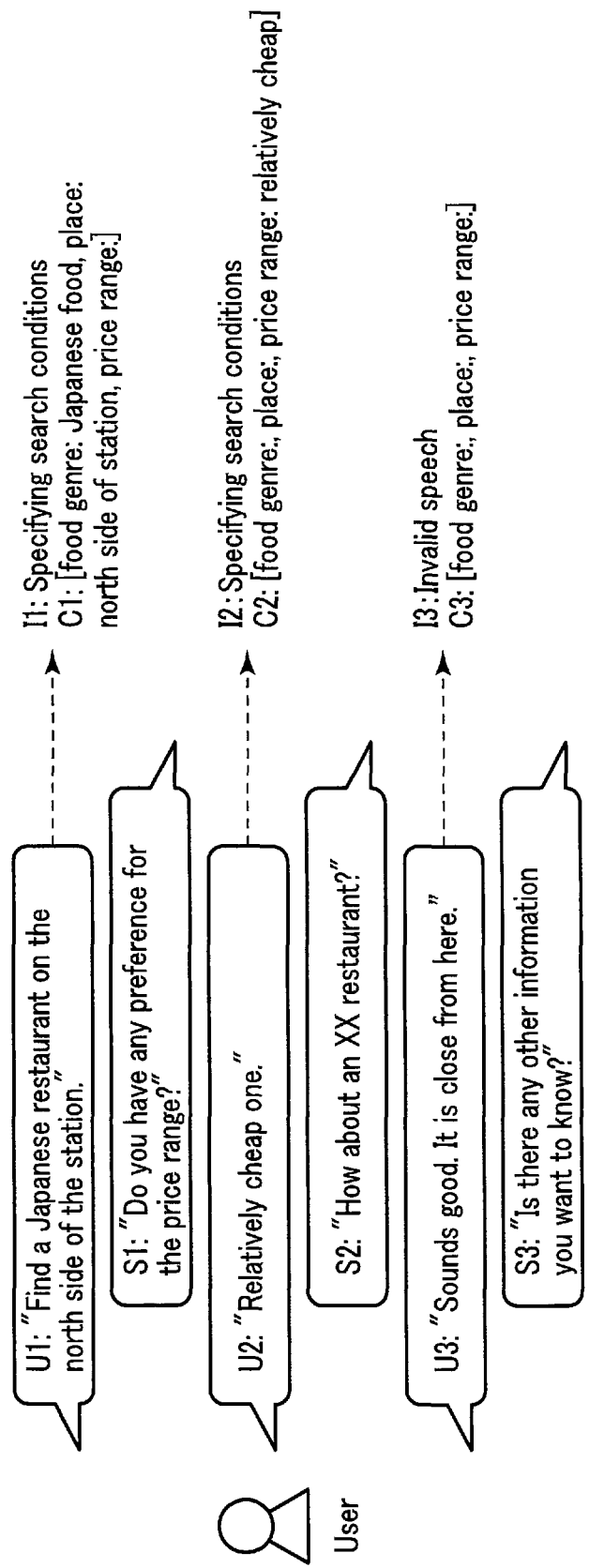
FIG. 5 is a diagram showing an example of a dialogue realized by the spoken sentence processing apparatus according to the second embodiment.

FIGS. 5, 6A and 6B, and 7A and 7B are diagrams showing an example of a dialogue realized by the spoken sentence processing apparatus 1 according to the second embodiment. FIG. 5 illustrates three spoken sentences from the user and a response sentence of the spoken sentence processing apparatus 1 for each spoken sentence. The spoken sentence processing apparatus 1 receives spoken sentences U1, U2, and U3 from the user, estimates intentions I1, I2, and I3 of the spoken sentences and search conditions C1, C2, and C3, and then outputs response sentences S1, S2, and S3. Each intention is estimated by the intention estimation model 121. Each search condition includes a combination of three attributes (food genre, place, price range), and each value is estimated by the search condition estimation model 122 corresponding to each attribute.

For example, in the first turn (U1-S1) of the interaction, based on a spoken sentence U1 "Find a Japanese restaurant on the north side of the station." from the user, the spoken sentence processing apparatus 1 estimates an intention I1

"specifying search conditions" and a search condition C1 "food genre: Japanese food, place: north side of station, Price range:" for the spoken sentence U1. Here, the price range that is one attribute related to the search condition C1 is an empty value. Therefore, based on the estimated intention I1 and the search condition C1, the spoken sentence processing apparatus 1 outputs a response sentence S1 "Do you have a preference for the price range?" that asks the user about the search condition regarding the price range. As described above, in a general situation, when the estimated intention is "specifying search conditions", a specific value is estimated with any one attribute related to the search condition.

On the other hand, in the third turn of the interaction (U3-S3), based on a spoken sentence U3 "Sounds good. It is close from here." from the user, the spoken sentence processing apparatus 1 estimates an intention I3 "invalid speech" and a search condition C3 "food genre: place: price range:" for the spoken sentence U3. Here, each attribute related to the search condition C3 is an empty value. Therefore, the spoken sentence processing apparatus 1 outputs a response sentence S3 "Is there any other information you want to know?" indicating that the response sentence cannot be made.

Figure 6A:
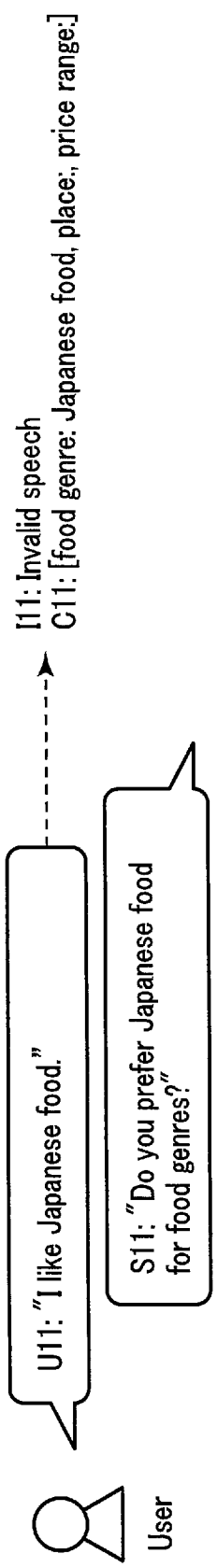
FIGS. 6A and 6B are diagrams showing an example of a dialogue realized by the spoken sentence processing apparatus according to the second embodiment.

In FIG. 6A, the spoken sentence processing apparatus 1 estimates an intention I11 "invalid speech" and a search condition C11 "food genre: Japanese food, place: price range:" for a spoken sentence U11 based on a spoken sentence U11 "I like Japanese food." from the user. Subsequently, the spoken sentence processing apparatus 1 determines that the spoken sentence U11 is an invalid speech in the result of the intention estimation, and determines that the spoken sentence U11 is a valid speech in the result of the search condition estimation (corresponding to the fourth determination result). Therefore, the spoken sentence processing apparatus 1 outputs a response sentence S11 "Do you prefer Japanese food for food genres?" that prompts the user to confirm "Japanese food", which is the estimated search condition.

Figure 6B:
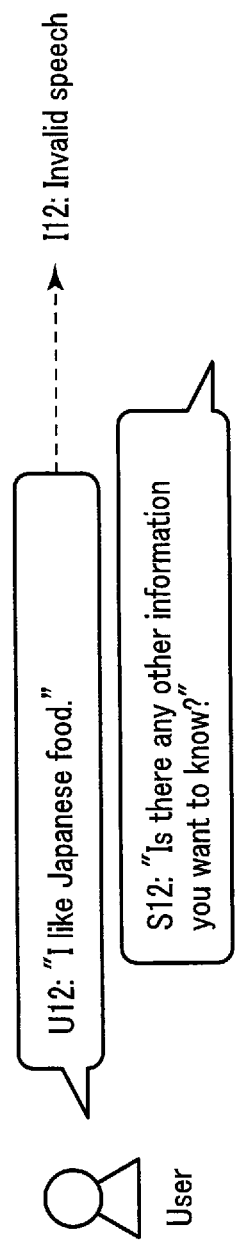

In FIG. 6B, a case is assumed where the spoken sentence processing apparatus according to a conventional example includes only an estimator related to intention estimation but does not include an estimator related to search condition estimation. The apparatus estimates an intention 112 "invalid speech" for a spoken sentence U11 based on a spoken sentence U12 similar to the spoken sentence U12. Therefore, the apparatus outputs a response sentence S12 "Is there any other information you want to know?" notifying the user that the response sentence cannot be made. In other words, even in the same situation, the apparatus including only one type of estimator cannot proceed with flexible interaction such as generating a response sentence that prompts the user to confirm as in the spoken sentence processing apparatus 1 including two types of estimators.

Figure 7A:
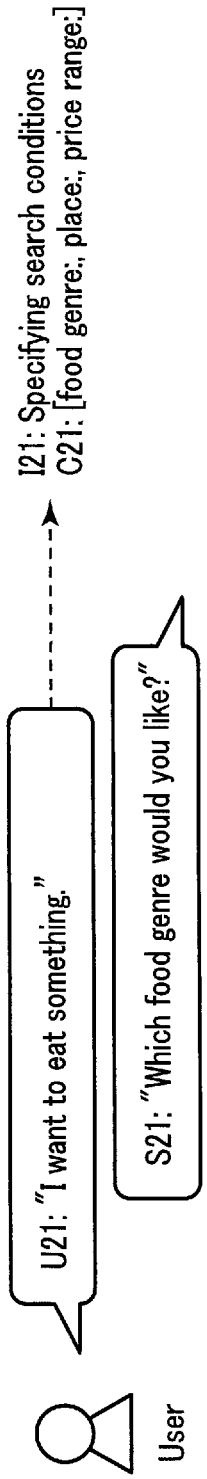
Figure 7A:
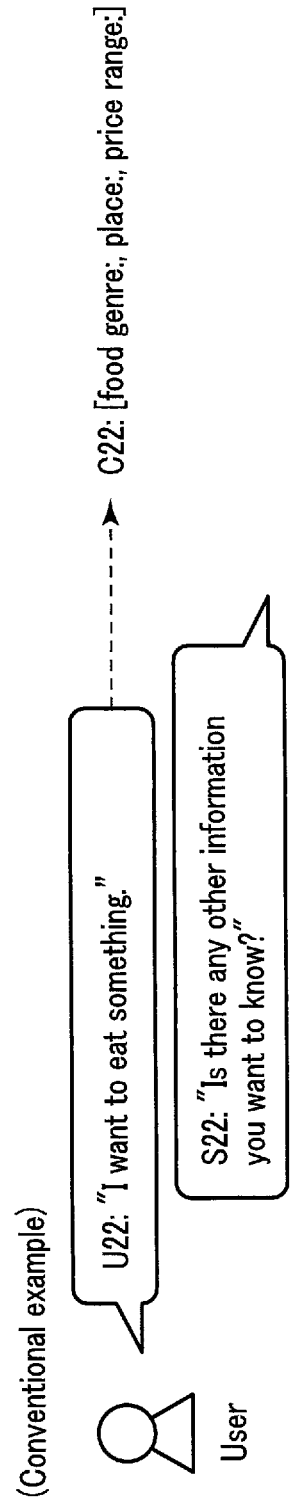

In FIG. 7A, based on a spoken sentence U21 "I want to eat something." from the user, the spoken sentence processing apparatus 1 estimates an intention 121 "specifying search conditions" and a search condition C21 "food genre: place: price range:" for the spoken sentence U21. Subsequently, the spoken sentence processing apparatus 1 determines that the spoken sentence U21 is a valid speech in the intention estimation result, and determines that the spoken sentence U21 is an invalid speech in the search condition estimation result (corresponding to the fifth determination result). Therefore, the spoken sentence processing apparatus 1 outputs a response sentence S21 "Which food genre would you like?" that prompts the user to specify at least one search condition.

In FIG. 7B, it is assumed that the spoken sentence processing apparatus according to a conventional example includes only an estimator related to search condition estimation and does not include an estimator related to intention estimation. Based on a spoken sentence U22 similar to the spoken sentence U21, the apparatus estimates a search condition C22 "food genre: place: price range:" for the spoken sentence U22. Therefore, the apparatus outputs a response sentence S22 "Is there any other information you want to know?" notifying the user that the response sentence cannot be made. In other words, even in the same situation, the apparatus including only one kind of estimator cannot perform a flexible interaction such as generating a response sentence that prompts the user to specify at least one search condition as in the spoken sentence processing apparatus 1 including two kinds of estimators.

The spoken sentence processing apparatus 1 according to the second embodiment has been described above. The spoken sentence processing apparatus 1 according to the second embodiment determines whether or not a spoken sentence from a user is an invalid speech using each of an estimator based on intention estimation and an estimator based on search condition estimation. Subsequently, the spoken sentence processing apparatus 1 generates and outputs an appropriate response sentence based on each estimation result obtained from each estimator.

For example, in a case where a spoken sentence has been estimated to be an invalid speech in the intention estimation, while "food genre: Japanese food" has been estimated as a search condition for the spoken sentence in the search condition estimation, the spoken sentence processing apparatus 1 can output a response sentence indicating to inquire the user about the search condition. In a case where the user agreed the response sentence, the spoken sentence processing apparatus 1 can recognize that the intention estimation has failed. Conversely, in a case where the user denies the response sentence, the spoken sentence processing apparatus 1 can recognize that the search condition estimation has failed. In other words, the spoken sentence processing apparatus 1 can classify the cause regarding which estimator has failed in the estimation. Furthermore, the spoken sentence processing apparatus 1 can return the response sentence corresponding to each cause by using the fixed phrase of the response sentence corresponding to the failure cause. Therefore, the spoken sentence processing apparatus 1 can advance a more flexible interaction.

Third Embodiment

FIG. 8 is a block diagram showing a functional configuration example of a spoken sentence processing apparatus 1 according to a third embodiment. The spoken sentence processing apparatus 1 according to the third embodiment further includes a storage unit 117 and a sample memory unit 124 in addition to the configurations (the reception unit 111, first estimation unit 112, second estimation unit 113, and determination unit 114) included in the spoken sentence processing apparatus 1 according to the first embodiment.

As a result of an intention estimation (first estimation result), the first estimation unit 112 estimates a similarity between a feature amount of a spoken sentence from a user and a feature amount of a spoken sentence in each of a plurality of samples stored in the sample memory unit 124. Specifically, the first estimation unit 112 extracts the feature amount of the spoken sentence by applying the intention estimation model 121 to the spoken sentence received from the reception unit 111. Subsequently, the first estimation unit 112 estimates similarity between the extracted feature amount and the feature amount of the spoken sentence in each of the plurality of samples stored in the sample memory unit 124. Thereafter, the first estimation unit 112 outputs the estimated similarity to the determination unit 114. Note that the first estimation unit 112 may output the feature amount of the spoken sentence from the user to the storage unit 117.

The similarity is, for example, cosine similarity between vectors representing feature amounts of spoken sentences. The vector is, for example, a vector in a hidden state calculated by a model based on deep learning such as the intention estimation model 121. In a case where each cosine similarity is equal to or less than a predetermined threshold value, the determination unit 114 determines that the user's spoken sentence is an invalid speech in the first estimation result. Alternatively, the similarity may be a Euclidean distance between the vectors. In this case, when each Euclidean distance is larger than the predetermined threshold value, the determination unit 114 determines that the user's spoken sentence is an invalid speech in the first estimation result. In addition, the determination unit 114 may specify a feature amount of a sample in the vicinity of a feature amount of a spoken sentence from the user based on the nearest neighbor method, and may specify an intention label to which the sample belongs. Incidentally, the determination unit 114 determines whether or not the user's spoken sentence is an invalid speech in the estimation result (second estimation result) of the search condition by a method similar to the method described in the first embodiment.

The storage unit 117 receives the determination result from the determination unit 114, and stores the feature amount of the spoken sentence from the user in the sample memory unit 124 according to the type of the received determination result. Specifically, the storage unit 117 stores the feature amount of the spoken sentence from the user according to the second determination result (that is, a determination result indicating that the first estimation result from the first estimation unit 112 and the second estimation result from the second estimation unit 113 contradict each other.). In particular, the storage unit 117 stores the feature amount of the spoken sentence from the user in a case where it is estimated as "specifying search conditions" in the intention estimation, and no specific value is estimated for all the attributes in the search condition estimation. Alternatively, the storage unit 117 may store the feature amount of the spoken sentence from the user in a case where it is estimated as "specifying the search condition" in the intention estimation, and a specific value is specified in the search condition estimation, but the probability relevant to the value is lower than a preset threshold value.

The sample memory unit 124 stores a plurality of samples in which an intention label corresponding to each of a plurality of candidates regarding an intention is associated with a feature amount of a spoken sentence corresponding to the intention label. In other words, each sample is a pair in which one intention label and a feature amount of one spoken sentence are associated with each other. Each intention label is each intention assumed in advance, similar to an intention class. That is, the intention label is one of K+1 intention labels including K including "specifying search conditions", "greeting", "agreeing or disagreeing", "operating the system", and the like, and one "invalid speech". An engineer who manages the spoken sentence processing apparatus 1 may extract a feature amount of a spoken sentence from each example by applying the intention estimation model 121 to a plurality of examples of spoken sentences collected in advance, and assign at least one of the extracted feature amounts to each intention label.

FIG. 9 is a flowchart showing an operation example of the spoken sentence processing apparatus 1 according to the third embodiment. Steps S301 to S304 according to the third embodiment are similar to steps S101 to S104 according to the first embodiment except for step S302.

In step S302, the first estimation unit 112 extracts a feature amount by applying the intention estimation model 121 to a spoken sentence from the user. Subsequently, the first estimation unit 112 calculates similarity between the extracted feature amount and the feature amount of at least one spoken sentence stored in the sample memory unit 124.

In step S305, the storage unit 117 selects whether or not to store the user's spoken sentence based on the determination result of the determination unit 114. When the storage unit 117 selects to store the spoken sentence (Yes in step S305), the process proceeds to step S306. On the other hand, when the storage unit 117 selects not to store the spoken sentence (No in step S305), the series of operations ends.

In step S306, the storage unit 117 stores the feature amounts of the user's spoken sentences in the sample memory unit 124. After step S306, the spoken sentence processing apparatus 1 may end a series of operations and wait for reception of the next spoken sentence.

The spoken sentence processing apparatus 1 according to the third embodiment has been described above. The spoken sentence processing apparatus 1 according to the third embodiment determines whether or not a spoken sentence from a user is an invalid speech using each of an estimator based on intention estimation and an estimator based on search condition estimation. Specifically, the spoken sentence processing apparatus 1 extracts the feature amount of the spoken sentence by applying the intention estimation model 121 to the user's spoken sentence, and calculates the similarity between the extracted feature amount and the feature amount of at least one spoken sentence stored in the sample memory unit 124. Subsequently, the spoken sentence processing apparatus 1 performs intention estimation based on the calculated similarity. Thereafter, the spoken sentence processing apparatus 1 stores the feature amount of the spoken sentence from the user according to the determination result.

According to the third embodiment, even if the intention estimation model 121 gives a high probability to an erroneous estimation result, it is possible to automatically correct an error in intention estimation based on an estimation result from a different viewpoint of search condition estimation. As the spoken sentence processing apparatus 1 is operated, the number of cases as described above increases and the number of samples increases, so that the number of types of invalid speeches that can be correctly recognized increases. As a result, the spoken sentence processing apparatus 1 can improve robustness of intention estimation.

Note that the spoken sentence processing apparatus 1 according to the third embodiment is applicable not only to the intention "specifying search conditions" exemplified above but also to other intentions (for example, greeting, agreeing or disagreeing, operating the system). For example, the spoken sentence processing apparatus 1 according to the third embodiment can be similarly applied to a case where the result of the intention estimation is "greeting", "agreeing or disagreeing", or "operating the system", but the result of the search condition estimation does not match any of the previously-assumed values.

Furthermore, an engineer or the like who manages the spoken sentence processing apparatus 1 can improve the detection accuracy of the system by diverting the extracted feature amount of the invalid speech of the user to another spoken dialog system different from the spoken sentence processing apparatus 1.

Furthermore, the spoken sentence processing apparatus 1 according to the third embodiment may further include the response generation unit 115 and the output unit 116 according to the second embodiment. The spoken sentence processing apparatus 1 according to the combination of the two embodiments can generate and output a response sentence based on the determination result while storing the feature amount of the spoken sentence from the user according to the determination result.

Figure 10:
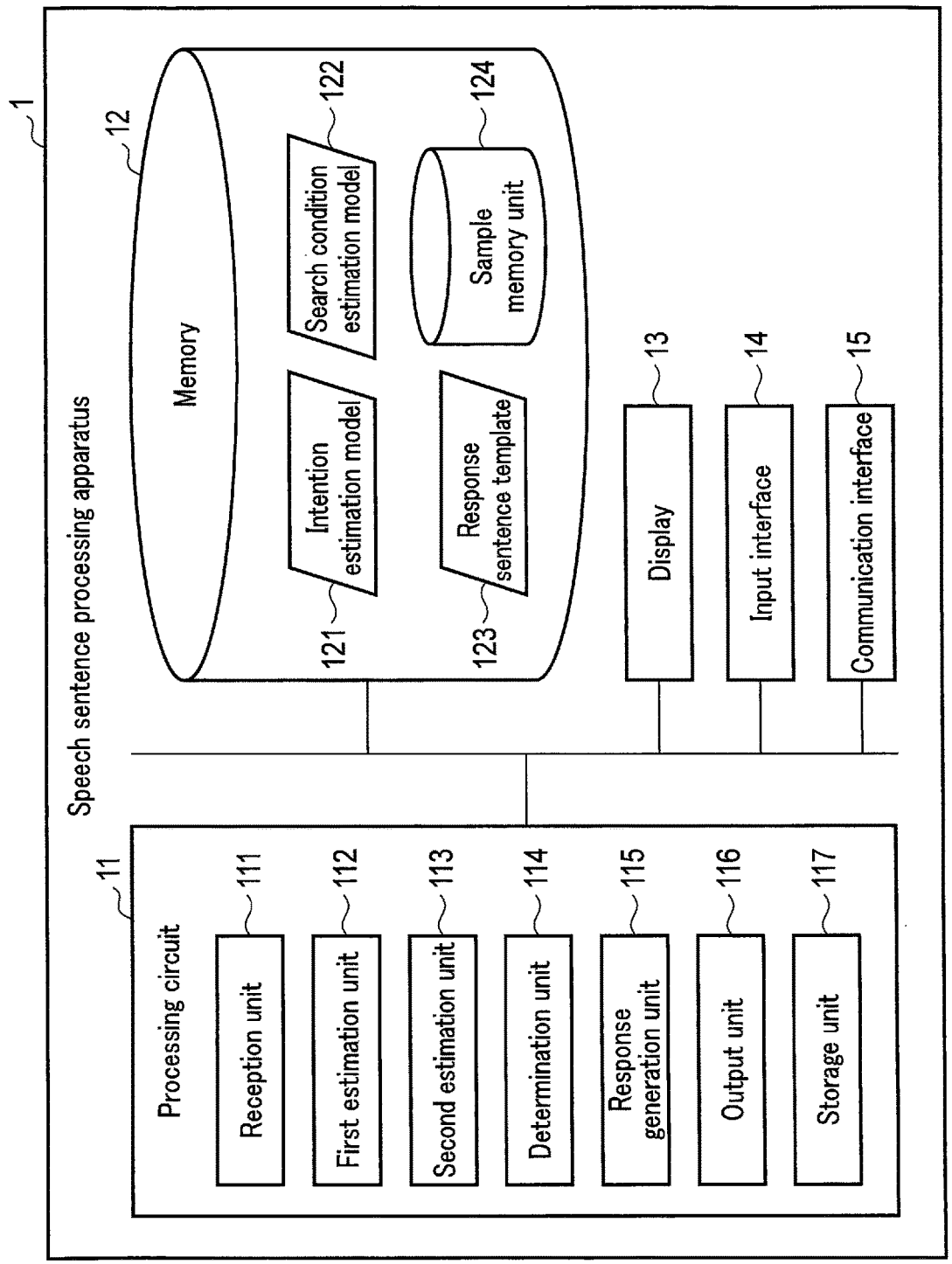
FIG. 10 is a block diagram showing a hardware configuration example of the spoken sentence processing apparatus according to the first to third embodiments.

FIG. 10 is a block diagram showing a hardware configuration example of the spoken sentence processing apparatus 1 according to the first to third embodiments. The spoken sentence processing apparatus 1 includes a processing circuit 11, a memory 12, a display 13, an input interface 14, and a communication interface 15 as hardware.

The processing circuit 11 controls the operation of the spoken sentence processing apparatus 1. The processing circuit 11 includes a processor such as a central processing unit (CPU), a micro processing unit (MPU), or a graphics processing unit (GPU) as hardware. The processing circuit 11 realizes each unit (for example, the reception unit 111, first estimation unit 112, second estimation unit 113, determination unit 114, response generation unit 115, output unit 116, and storage unit 117) corresponding to each program by executing each program expanded in the memory 12 via at least one processor. Note that each unit can be realized by the processing circuit 11 including a single processor or the processing circuit 11 combining a plurality of processors.

The memory 12 stores information such as data and programs used by the processing circuit 11. The memory 12 includes a semiconductor memory element such as a random access memory (RAM) as hardware. The memory 12 may be a drive apparatus that reads and writes information from and to an external storage apparatus such as a magnetic disk (Floppy (registered trademark) disk, hard disk), a magneto-optical disk (MO), an optical disk (CD, DVD, Blu-ray (registered trademark)), a flash memory (USB flash memory, memory card, SSD), or a magnetic tape. Note that the storage area of the memory 12 may be in an internal or external storage apparatus of the spoken sentence processing apparatus 1. Incidentally, the memory 12 may store the intention estimation model 121, the search condition estimation model 122, the response sentence template 123, and the sample memory unit 124. Furthermore, the memory 12 and the sample memory unit 124 may be configured separately from each other.

The display 13 displays information such as data generated by the processing circuit 11 and data stored in the memory 12. As the display 13, for example, a display such as a cathode ray tube (CRT) display, a liquid crystal display (LCD), a plasma display, an organic electroluminescence (OELD: Organic ElectroLuminescence Display) display, or a tablet terminal can be used. Incidentally, the display 13 may display a response sentence.

The input interface 14 receives an input from a user who uses the spoken sentence processing apparatus 1, converts the received input into an electrical signal, and outputs the electrical signal to the processing circuit 11. As the input interface 14, physical operation components such as a mouse, a keyboard, a trackball, a switch, a button, a joystick, a touch pad, a touch panel display, and a microphone can be used. Note that the input interface 14 may be an apparatus that receives an input from an external input apparatus that is separate from the spoken sentence processing apparatus 1, converts the received input into an electrical signal, and outputs the electrical signal to the processing circuit 11. Incidentally, the input interface 14 may receive an input related to a predetermined threshold value or the like from an engineer who manages the spoken sentence processing apparatus 1.

The communication interface 15 transmits and receives data to and from an external apparatus. Any communication standard can be used between the communication interface 15 and the external apparatus. Incidentally, the communication interface 15 may receive a spoken sentence from the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A spoken sentence processing apparatus comprising a processing circuit configured to:
   receive a spoken sentence from a user,
   estimate an intention expressed by the user based on the spoken sentence,
   estimate a search condition specified by the user based on the spoken sentence,
   determine whether the spoken sentence is an invalid speech respectively in a first estimation result related to the estimated intention and a second estimation result related to the estimated search condition, and
   calculate a first determination result indicating that the spoken sentence is determined not to be an invalid speech in each of the first estimation result and the second estimation result, a second determination result indicating that the spoken sentence is determined to be an invalid speech in one of the first estimation result and the second estimation result, and a third determination result indicating that the spoken sentence is determined to be an invalid speech in each of the first estimation result and the second estimation result.

2. The spoken sentence processing apparatus according to claim 1, wherein the processing circuit is further configured to:
   respectively generate a response sentence that corresponds to each of the first determination result, the second determination result, and the third determination result, and
   output the response sentence.

3. The spoken sentence processing apparatus according to claim 2, wherein:
   the second determination result includes a fourth determination result indicating that the spoken sentence is determined to be an invalid speech in the first estimation result and the spoken sentence is determined not to be an invalid speech in the second estimation result, and a fifth determination result indicating that the spoken sentence is determined not to be an invalid speech in the first determination result and the spoken sentence is determined to be an invalid speech in the second estimation result, and the processing circuit is further configured to:

generate a response sentence to prompt the user to confirm the estimated search condition as a response sentence corresponding to the fourth determination result, and generate a response sentence to prompt the user to specify at least one search condition as a response sentence corresponding to the fifth determination result.

4. The spoken sentence processing apparatus according to claim 2, wherein the processing circuit is further configured to output the response sentence to a display device or an audio device.

5. The spoken sentence processing apparatus according to claim 1, wherein the processing circuit is further configured to estimate, as the first estimation result, first probabilities that the spoken sentence is relevant to intention classes corresponding to each of a plurality of intention-related candidates.

6. The spoken sentence processing apparatus according to claim 5, wherein:

in a case where an intention class corresponding to an invalid speech is included in the intention classes, the processing circuit is further configured to determine that the spoken sentence is an invalid speech in the first estimation result if the intention class to which a highest first probability of the first probabilities is given is the intention class corresponding to the invalid speech.

7. The spoken sentence processing apparatus according to claim 5, wherein:

in a case where an intention class corresponding to an invalid speech is not included in the intention classes, the processing circuit is further configured to determine that the spoken sentence is an invalid speech in the first estimation result if each of the first probabilities is equal to or lower than a threshold value.

8. The spoken sentence processing apparatus according to claim 1, further comprising:

a memory that stores a plurality of samples that associate intention labels respectively corresponding to a plurality of intention-related candidates with feature amounts of spoken sentences corresponding to the intention labels, wherein the processing circuit is further configured to estimate, as the first estimation result, a similarity between a feature amount of the spoken sentence from the user and a feature amount of the spoken sentence in each of the samples.

9. The spoken sentence processing apparatus according to claim 8, wherein:

the similarity is a cosine similarity between vectors representing feature amounts of spoken sentences, and the processing circuit is further configured to determine that the spoken sentence of the user is an invalid speech in the first estimation result, if each cosine similarity is equal to or lower than a threshold value.

10. The spoken sentence processing apparatus according to claim 8, wherein the processing circuit is further configured to store, in the memory, the feature amount of the spoken sentence from the user according to the second determination result.

11. The spoken sentence processing apparatus according to claim 1, wherein the processing circuit is further configured to:

estimate, as the second estimation result, second probabilities that the spoken sentence is relevant to each of a plurality of values related to a search condition, and determine that the spoken sentence is an invalid speech in the second estimation result if each of the second probability is equal to or lower than a threshold value.

12. A spoken sentence processing method comprising:

receiving a spoken sentence from a user;

estimating an intention expressed by the user based on the spoken sentence;

estimating a search condition specified by the user based on the spoken sentence;

determining whether the spoken sentence is an invalid speech respectively in a first estimation result related to the estimated intention and a second estimation result related to the estimated search condition; and calculating a first determination result indicating that the spoken sentence is determined not to be an invalid speech in each of the first estimation result and the second estimation result, a second determination result indicating that the spoken sentence is determined to be an invalid speech in one of the first estimation result and the second estimation result, and a third determination result indicating that the spoken sentence is determined to be an invalid speech in each of the first estimation result and the second estimation result.

13. A non-transitory computer readable medium including computer executable instructions, wherein the instructions, when executed by a processor, cause the processor to perform a method comprising:

receiving a spoken sentence from a user;

estimating an intention expressed by the user based on the spoken sentence;

estimating a search condition specified by the user based on the spoken sentence;

determining whether the spoken sentence is an invalid speech respectively in a first estimation result related to the estimated intention and a second estimation result related to the estimated search condition; and calculating a first determination result indicating that the spoken sentence is determined not to be an invalid speech in each of the first estimation result and the second estimation result, a second determination result indicating that the spoken sentence is determined to be an invalid speech in one of the first estimation result and the second estimation result, and a third determination result indicating that the spoken sentence is determined to be an invalid speech in each of the first estimation result and the second estimation result.

* * * * *